(12) United States Patent
Park et al.

(10) Patent No.: US 8,750,791 B2
(45) Date of Patent: Jun. 10, 2014

(54) HUB, RELAY NODE, AND NODE FOR RECONFIGURING ACTIVE STATE POSITION IN WIRELESS BODY AREA NETWORK (WBAN), AND COMMUNICATION METHOD THEREOF

(75) Inventors: Chang Soon Park, Chungju-si (KR); Young Soo Kim, Seoul (KR); Hyo Sun Hwang, Seoul (KR); Sung Yeon Kim, Pocheon-si (KR); Jeong Ahn Kwon, Seoul (KR); Jang Won Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 255 days.

(21) Appl. No.: 13/357,666

(22) Filed: Jan. 25, 2012

(65) Prior Publication Data
US 2013/0178150 A1 Jul. 11, 2013

(30) Foreign Application Priority Data

Jan. 6, 2012 (KR) .......................... 10-2012-0001907

(51) Int. Cl.
*H04B 7/185* (2006.01)
(52) U.S. Cl.
USPC ........................................ 455/13.1; 455/100

(58) Field of Classification Search
CPC . H04W 40/22; H04W 56/00; H04W 52/0126; H04W 88/04; H04W 76/025
USPC ............................. 455/11.1, 13.1, 15, 16, 100
See application file for complete search history.

(56) References Cited

U.S. PATENT DOCUMENTS

2012/0051401 A1\* 3/2012 Monier et al. ................ 375/134

FOREIGN PATENT DOCUMENTS

| EP | 1780951 A2 | 5/2007 |
|---|---|---|
| JP | 2010-231566 A | 10/2010 |
| KR | 10-2011-0056006 A | 5/2011 |
| KR | 10-2011-0064297 A | 6/2011 |
| KR | 10-2011-0072344 A | 6/2011 |
| KR | 10-2011-0085175 A | 7/2011 |

OTHER PUBLICATIONS

Liu, Feng, et al. "Joint Routing and Sleep Scheduling for Lifetime Maximization of Wireless Sensor Networks." IEEE Transactions on Wireless Communications, vol. 9, No. 7, Jul. 2010, pp. 2258-2267.

\* cited by examiner

*Primary Examiner* — Tu X Nguyen
(74) *Attorney, Agent, or Firm* — NSIP Law

(57) ABSTRACT

Provided are a hub, a relay node, and a node for reconfiguring an active time position of a node in a WBAN. An active time position of the node may be reconfigured based on information associated with an active time position of a candidate relay node that the node desires to use as a relay node.

14 Claims, 11 Drawing Sheets

HUB, RELAY NODE, AND NODE FOR RECONFIGURING ACTIVE STATE POSITION IN WIRELESS BODY AREA NETWORK (WBAN), AND COMMUNICATION METHOD THEREOF

CROSS-REFERENCE TO RELATED APPLICATION(S)

This application claims the benefit under 35 U.S.C. §119 (a) of Korean Patent Application No. 10-2012-0001907, filed on Jan. 6, 2012, in the Korean Intellectual Property Office, the entire disclosure of which is incorporated herein by reference for all purposes.

BACKGROUND

1. Field

The following description relates to reconfiguring an active time position of a node in a wireless body area network (WBAN).

2. Description of Related Art

An Institute of Electrical and Electronics Engineers (IEEE) 802.15.6 standard is a protocol standard of a body area network (BAN). According to the IEEE 802.15.6 standard, a hub and a node may communicate with each other by forming a star topology or an extended star topology. In the star topology, the node may directly communicate with the hub without the use of a relay. In the extended star topology, the node may communicate with the hub using one or more other nodes as relays.

In the extended star topology, the hub or the node may select a relay node. For example, a node may directly select the relay node. In this example, the node may hear an acknowledgment (ACK) signal or a T-poll signal of another node capable of being the relay node, and may determine whether the other node is qualified to be the relay node. To select the relay node, the node and the relay node may need to be awake in the same time interval.

Because a time duration includes an active time and an inactive time, nodes included in a BAN may not hear a signal of another node while in the inactive time. Furthermore, nodes having an active time different from the active time of the node cannot be the relay node.

In another example, the node may communicate with the hub using another node as a relay. In this example, if another node having the same active time is absent around the node, the node may not communicate with the hub.

SUMMARY

In one general aspect, there is provided a communication method of a node in a wireless body area network (WBAN) comprising a hub, a relay node, and the node that communicates with the hub via the relay node, the method including receiving, from the hub via the relay node, information associated with an active time position of a candidate relay node included in the WBAN, receiving a signal transmitted from the candidate relay node, based on the received information associated with the active time position of the candidate relay node, transmitting a connection request signal between the candidate relay node and the node to the hub via the relay node, based on the signal transmitted from the candidate relay node, and reconfiguring an active time position of the node based on a connection assignment signal that is received in response to the connection request signal.

The information associated with the active time position of the candidate relay node may comprise information associated with a transmission point in time of a signal indicating whether an operational state of the candidate relay node is in an active state.

The method may further comprise changing an operational state of the node from an inactive state to an active state, in response to the received information associated with the active time position of the candidate relay node.

The reconfiguring may comprise reconfiguring the active time position of the node to match the active time position of the candidate relay node, in response to the connection assignment signal.

The hub may store information associated with an active time position and a wake-up period of each of the relay node, the node, and the candidate relay node.

In another aspect, there is provided a communication method of a hub in a wireless body area network (WBAN) comprising the hub, a relay node, and a node that communicates with the hub via the relay node, the method including receiving, from a candidate relay node included in the WBAN, information associated with an active time position of the candidate relay node, transmitting information associated with the active time position of the candidate relay node to the relay node, receiving, from the node via the relay node, a connection request signal requesting connection with the candidate relay node, and transmitting a connection assignment signal assigning the connection with the candidate relay node, in response to the connection request signal.

The information associated with the active time position of the candidate relay node may comprise information associated with a transmission point in time of a signal indicating whether an operational state of the candidate relay node is in an active state.

The hub may store information associated with an active time position and a wake-up period of each of the relay node, the node, and the candidate relay node.

In another aspect, there is provided a computer-readable storage medium having stored therein program instructions to cause a processor to execute a method of a node in a wireless body area network (WBAN) comprising a hub, a relay node, and the node that communicates with the hub via the relay node, the method including receiving, from the hub via the relay node, information associated with an active time position of a candidate relay node included in the WBAN, receiving a signal transmitted from the candidate relay node, based on the received information associated with the active time position of the candidate relay node, transmitting a connection request signal between the candidate relay node and the node to the hub via the relay node, based on the signal transmitted from the candidate relay node, and reconfiguring an active time position of the node based on a connection assignment signal that is received in response to the connection request signal.

In another aspect, there is provided a node in a wireless body area network (WBAN) comprising a hub, a relay node, and the node that communicates with the hub via the relay node, the node including a receiver to receive, from the hub via the relay node, information associated with an active time position of a candidate relay node included in the WBAN, and to receive a signal transmitted from the candidate relay node using information associated with the active time position of the candidate relay node, a transmitter to transmit a connection request signal requesting connection with the candidate relay node, to the hub, via the relay node based on the signal transmitted from the candidate relay node, and a reconfiguration unit to reconfigure an active time position of the node based on a connection assignment signal that is received in response to the connection request signal.

The information associated with the active time position of the candidate relay node may comprise information associated with a transmission point in time of a signal indicating whether an operational state of the candidate relay node is in an active state.

The node may further comprise a state change unit to change an operational state of the node from an inactive state to an active state, in response to the received information associated with the active time position of the candidate relay node.

The reconfiguration unit may reconfigure the active time position of the node to match the active time position of the candidate relay node in response to the connection assignment signal.

The hub may store information associated with an active time position and a wake-up period of each of the relay node, the node, and the candidate relay node.

In another aspect, there is provided a hub in a wireless body area network (WBAN) comprising the hub, a relay node, and a node that communicates with the hub via the relay node, the hub including a receiver to receive, from a candidate relay node included in the WBAN, information associated with an active time position of the candidate relay node, and to receive, from the node via the relay node, a connection request signal requesting connection with the candidate relay node, and a transmitter to transmit information associated with the active time position of the candidate relay node to the relay node, and to transmit a connection assignment signal assigning the connection with the candidate relay node, in response to the connection request signal.

The information associated with the active time position of the candidate relay node may comprise information associated with a transmission point in time of a signal indicating whether an operational state of the candidate relay node is in an active state.

The hub may store information associated with an active time position and a wake-up period of each of the relay node, the node, and the candidate relay node.

In another aspect, there is provided a terminal that communicates with a node via a relay node included in a wireless body area network (WBAN), the terminal including a receiver to receive active time information of one or more neighboring nodes included in the WBAN, and a transmitter to transmit active time information of the one or more neighboring nodes to the node that is currently using the relay node to communicate with the terminal.

The transmitter may transmit the active time information of the neighboring nodes to the node via the currently used relay node.

The receiver may receive a request from the node to replace the currently used relay node with a neighboring node, and the transmitter may transmit a connection assignment signal assigning a connection between the node and the neighboring node which enables the node to reconfigure an active time position of the node to match the active time position of the neighboring node.

The terminal may comprise one of a computer and a mobile phone, and the node may comprise a sensor that performs sensing of at least one of medical applications, mobile healthcare, and chemical/biological features of a patient.

In another aspect, there is provided a node that communicates with a hub via a current relay node in a wireless body area network (WBAN), the node including a receiver to receive a signal from a neighboring node, a determining unit to determine whether to change relay nodes from the current relay node to the neighboring node, based on the signal received from the neighboring node, a transmitter to transmit, to the hub, a request to change relay nodes, and a reconfiguration unit to reconfigure an active time of the node to match an active time of the neighboring node, based on a connection assignment signal received from the hub.

The transmitter may transmit the request to change relay nodes to the hub via the current relay node.

The hub may comprise one of a computer and a mobile phone, and the node may comprise a sensor that performs sensing of at least one of medical applications, mobile healthcare, and chemical/biological features of a patient.

Other features and aspects will be apparent from the following detailed description, the drawings, and the claims.

Figure 1:
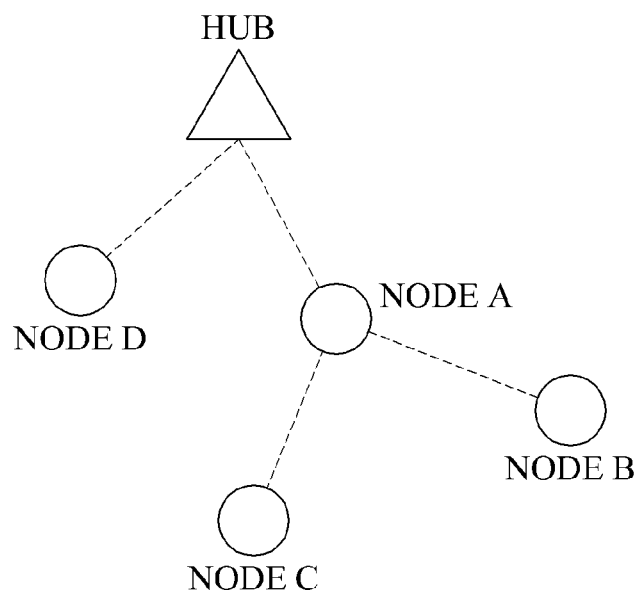
FIG. 1 is a diagram illustrating an example of nodes included in a wireless body area network (WBAN) system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of nodes included in a wireless body area network (WBAN) system.

Referring to FIG. 1, a WBAN system may include a hub and nodes. The hub may be, for example, a mobile communication terminal such as a smart phone, a personal digital assistant, a tablet, a home appliance, and the like. The nodes may be various sensors. The sensors may sense various data, for example, home security, medical applications, mobile healthcare, monitoring of chemical/biological features of a patient, mechanical failure diagnosis, environmental monitoring, sensing of information regarding disasters, intelligent physical distribution management, real-time security, remote monitoring, and the like.

The hub may receive biosignals, for example, to monitor a health state of the user, and may transfer the received biosignals to an external network. The remaining nodes excluding the hub may measure biosignals and transfer the biosignals to the hub. In an Institute of Electrical and Electronics Engineers (IEEE) 802.15.6 standard for a WBAN, a node may communicate with a hub using another node as a relay.

Referring to FIG. 1, nodes B and C may communicate with a hub through node A. In this example, node A acts as a relay. For example, a relay node may be directly selected by a node, or may be designated by the hub. For example, the node may hear an acknowledgement (ACK) signal or a T-poll signal transmitted from the hub, and may select the relay node based on the ACK signal or the T-poll signal. As an example, node C may determine whether to select node A as the relay node based on an ACK signal transmitted from node A to the hub or a T-poll signal transmitted from node A to node B.

Figure 2:
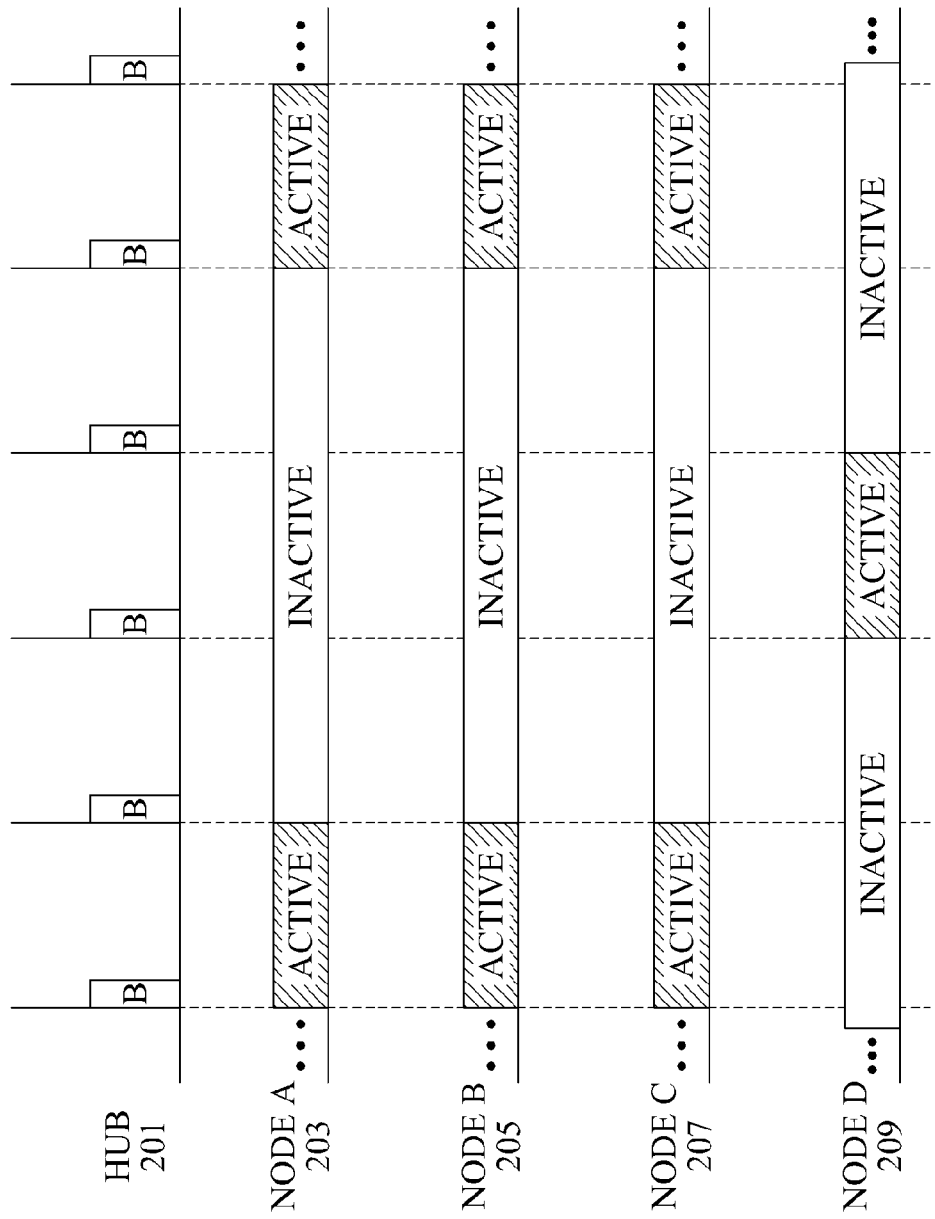
FIG. 2 is a diagram illustrating an example of wake-up periods of the nodes of FIG. 1 according to an Institute of Electrical and Electronics Engineers (IEEE) 802.15.6 standard.

FIG. 2 illustrates an example of wake-up periods of the nodes of FIG. 1 according to an IEEE 802.15.6 standard.

Referring to FIG. 2, an IEEE 802.15.6 standard may support a beacon mode in which super frames of all of the nodes operate based on a beacon signal B of a hub. The nodes may periodically repeat an active state and an inactive state. The repeating period may be defined as a wake-up period. The wake-up period may be different for one or more nodes. FIG. 2 illustrates an example of a super frame in which all of the nodes have wake-up periods.

According to the IEEE 802.15.6 standard, each node may have a different active time position. For example, node A 203 may relay signals of node B 205 and node C 207 to a hub 201, and thus, an active time position of node A 203 may include the same time interval as active time positions of node B 205 and node C 207. The active time position may be expressed as an active state position.

In this example, node D 209 may directly communicate with the hub 201, and thus, may not be affected by active time positions of other nodes. Referring to the example of FIG. 2, when node D 209 is in an active state, other nodes, for example, node A 203, node B 205, and node C 207 are in an inactive state. Therefore, node 203, node B 205, and node C 207 may not detect communication between node D 209 and the hub 201.

In general, a node selects a relay node. The node may listen for an ACK signal or a T-poll signal transmitted from another node, and may determine whether to select the other node as the relay node based on the transmitted signal. Accordingly, the node may select another node as the relay node. For example, the node may select another node having an active time position within the same time interval as the active time position of the node. For example, in FIG. 2, node C 207 may select node A 203 and/or node B 205 as the relay node, however, may not select the node D 209 as the relay node.

According to a method of selecting a relay node disclosed in the IEEE 802.15.6 standard, a portion of nodes having the same active time position may need to act as a relay for a plurality of nodes, and the selected relay node may consume a relatively great amount of energy compared to other nodes. In FIG. 1, node A may consume a relatively great amount of energy compared to the other nodes B, C, and D. In this example, a lifespan of node A may decrease and a network lifespan may also decrease.

Figure 3:
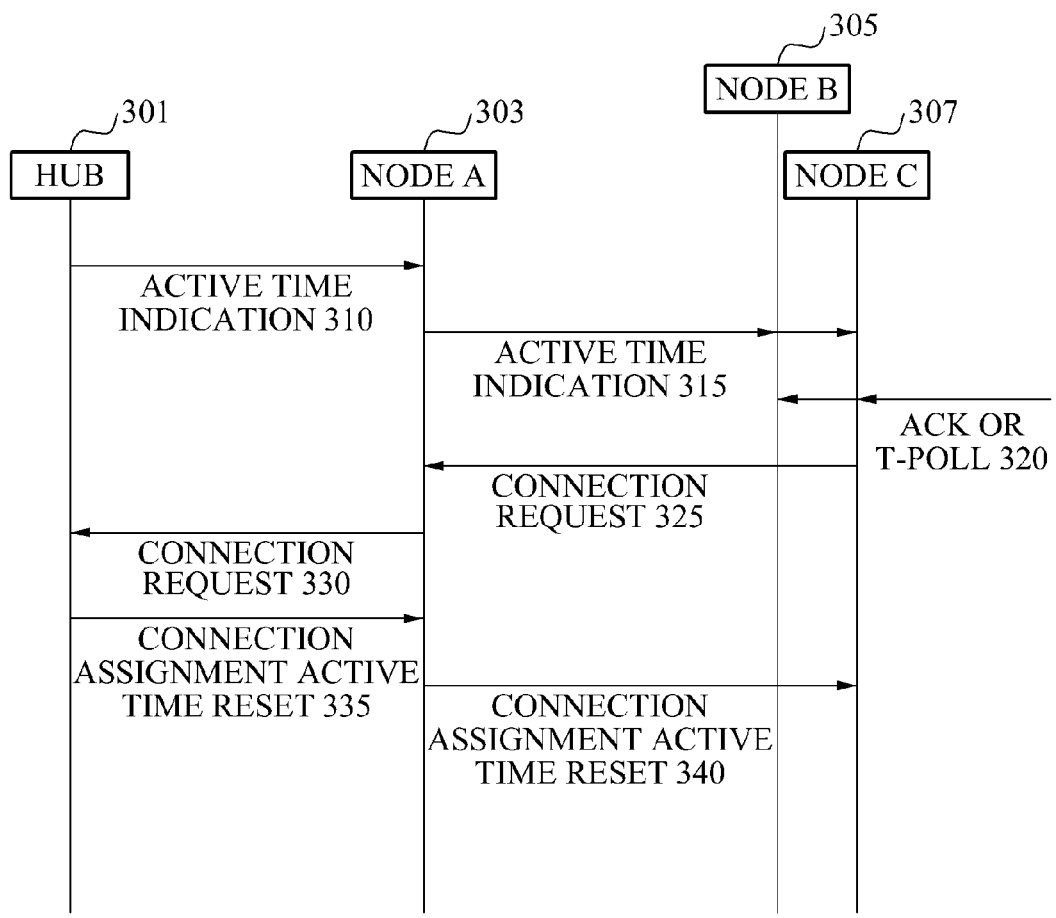
FIG. 3 is a flowchart illustrating an example of a method for reconfiguring an active time position of a node.

FIG. 3 illustrates an example of a method for reconfiguring an active time position of a node.

Referring to FIG. 3, a WBAN includes a hub, a relay node, and nodes that may communicate with the hub via the relay node. Referring to FIG. 3, node A 303 corresponds to the relay node. In this example, node B 305 and node C 307 may communicate with a hub 301 via node A 303 corresponding to the relay node. In 310 and 315, the hub 301 transmits information associated with an active time position of a candidate relay node, for example, node D of FIG. 1, included in the WBAN. For example, the hub 301 may transmit information to node B 305 and node C 307 via the relay node A 303.

In 320, node B 305 and node C 307 receive a signal transmitted from the candidate relay node using information associated with the active time position of the candidate relay node. For example, the candidate relay node may have an active time position within the same time interval as active time positions of node B 305 and/or node C 307, and thus, may be a candidate node capable of relaying a signal in addition to the relay node A 303 that relays signals transmitted from the hub 301 to the node B 305 and the node C 307.

Information associated with the active time position of the candidate relay node may include, for example, information associated with a transmission point time of each of at least one signal. For example, the information may include active time indication information that indicates whether an operational state of the candidate relay node is in an active state. In this example, the at least one signal may be an ACK signal transmitted from the candidate relay node to the hub 301 or a T-poll signal transmitted from the candidate relay node to at least one node.

In 325 and 330, node C 307 transmits a connection request signal requesting connection between the candidate relay node and node C 307, based on the signal transmitted from the candidate relay node. The connection request signal may be transferred to the hub 301 via the relay node A 303.

In 335 and 340, in response to the connection request signal, the hub 301 transmits a connection assignment signal informing node C 307 to assign the connection with the candidate relay node and to reconfigure the active time position of the node C 307. In this example, node A remains a relay node for node B 305, and the candidate node becomes a relay for node C 307.

Figure 4:
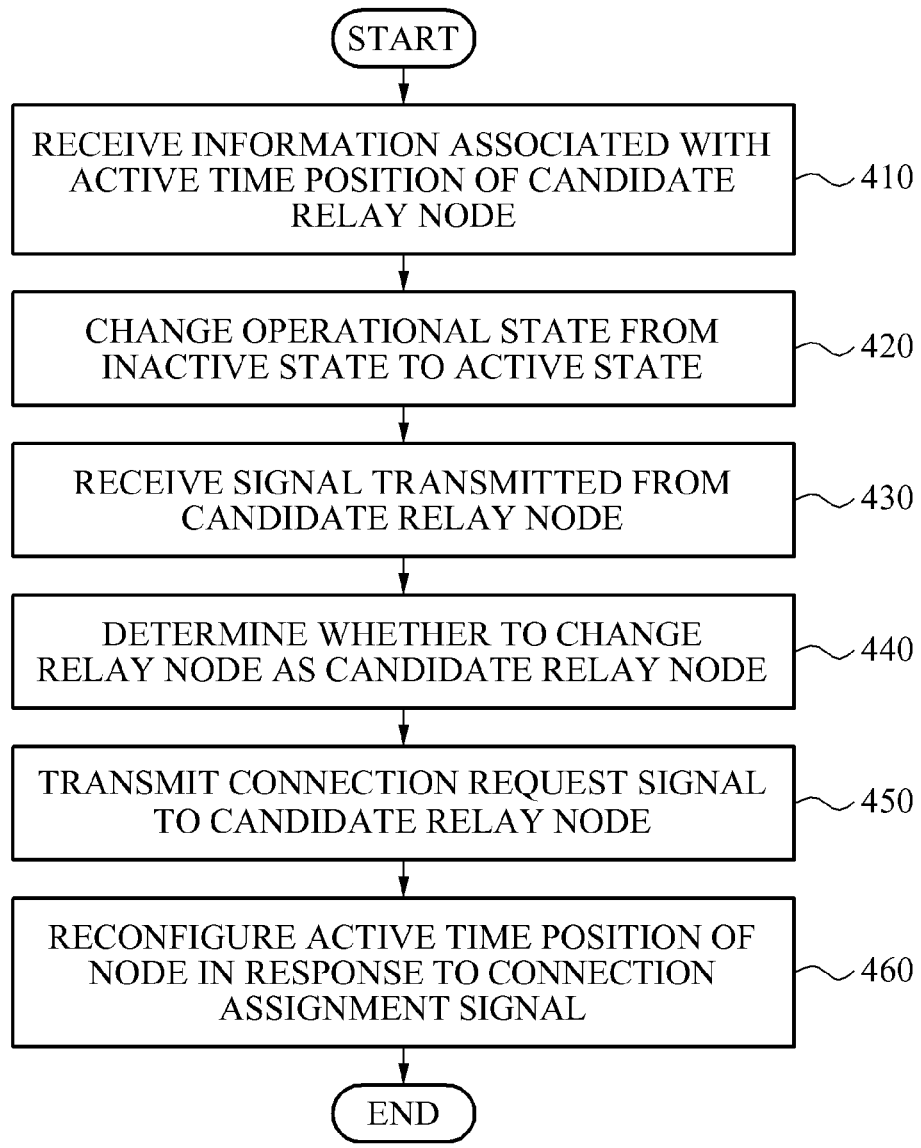
FIG. 4 is a flowchart illustrating an example of a communication method of a node to reconfigure an active time position of the node in a WBAN.

FIG. 4 illustrates an example of a communication method of a node to reconfigure an active time position of the node in a WBAN.

Referring to FIG. 4, a WBAN includes a hub, a relay node, and one or more nodes that may communicate with the hub via the relay node.

In 410, a node receives information associated with an active time position of a candidate relay node included in the WBAN. The information may be transmitted from the hub via the relay node. For example, information associated with the active time position of the candidate relay node may include information associated with a transmission point in time of each of at least one signal indicating whether an operational state of the candidate relay node is in an active state. The at least one signal may be an ACK signal transmitted from the candidate relay node to the hub or a T-poll signal transmitted from the candidate relay node to the node. The hub may include information associated with an active time position and a wake-up period of each of the relay node, the node, and the candidate relay node. As described herein, a wake-up period may indicate a period in which the active state and the inactive state repeat, and may be different for each respective node.

In 420, in response to the received information associated with the active time position of the candidate relay node, the node changes an operational state of the node from an inactive state to an active state. Because the operational state of the node is changed from the inactive state to the active state, the node may receive a signal transmitted from the candidate relay node.

In 430, the node receives a signal transmitted from the candidate relay node based on information associated with the active time position of the candidate relay node.

In 440, the node determines whether to change the relay node from the current relay node to the candidate relay node, based on the signal transmitted from the candidate relay node.

In 450, the node transmits a connection request signal between the candidate relay node and the node to the hub via the current relay node, based on the signal transmitted from the candidate relay node. For example, the node may transmit the connection request signal to the hub based on the determination of 440.

In 460, the node reconfigures an active time position of the node based on a connection assignment signal that is received from the hub via the relay node, in response to the connection request signal.

In 460, in response to the connection assignment signal, the node reconfigures the active time position of the node to match the active time position of the candidate relay node, in response to the connection assignment signal.

Figure 5:
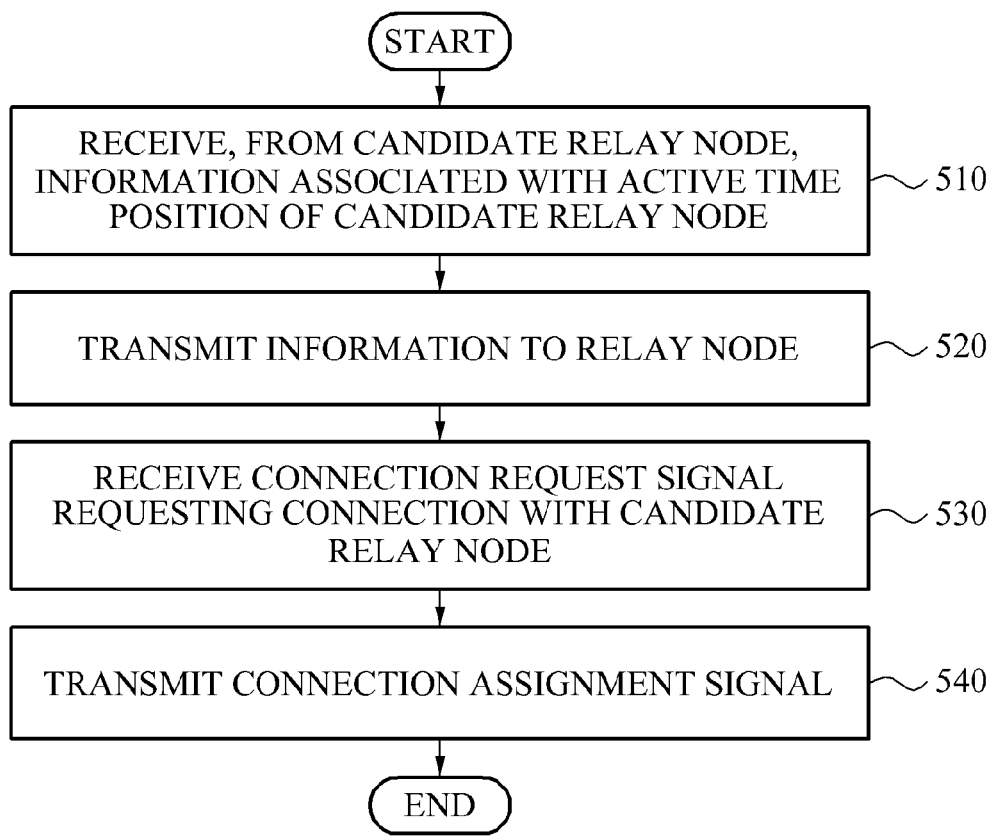
FIG. 5 is a flowchart illustrating an example of a communication method of a hub to reconfigure an active time position of a node in a WBAN.

FIG. 5 illustrates an example of a communication method of a hub to reconfigure an active time position of a node in a WBAN.

Referring to FIG. 5, 510, the hub receives, from a candidate relay node included in the WBAN, information associated with an active time position of the candidate relay node. For example, information associated with the active time position of the candidate relay node may include information associated with a transmission point in time of each of at least one signal indicating whether an operational state of the candidate relay node is in an active state.

In 520, the hub transmits information associated with the active time position of the candidate relay node to the relay node.

In 530, the hub receives, from the node via the relay node, a connection request signal in which the node requests connection with the candidate relay node.

In 540, in response to the connection request signal, the hub transmits a connection assignment signal assigning the connection with the candidate relay node.

For example, the hub may include information associated with an active time position and a wake-up period of each of the relay node, the node, and the candidate relay node.

Figure 6:
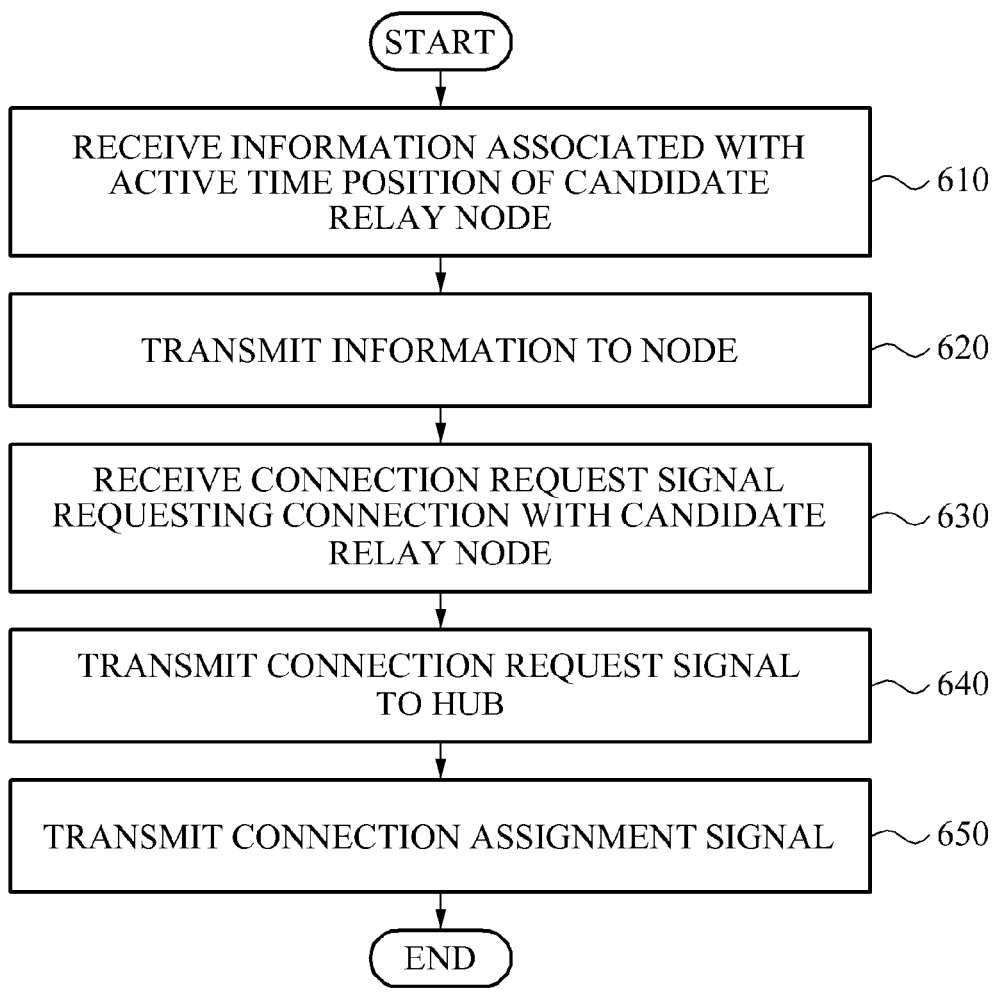
FIG. 6 is a flowchart illustrating an example of a relay node to reconfigure an active time position of a node in a WBAN.

FIG. 6 illustrates an example of a relay node to reconfigure an active time position of a node in a WBAN.

Referring to FIG. 6, in 610 and 620, the relay node receives, from the hub, information associated with an active time position of a candidate relay node that is included in the WBAN and then transmits information associated with the active time position of the candidate relay node to the node, respectively.

In 630, the relay node receives, from a node, a connection request signal requesting connection with the candidate relay node. The node may determine whether to change the relay node to the candidate relay node, based on information associated with the active time position of the candidate relay node.

In 640, the relay node transmits the connection request signal to the hub. In response to the connection request signal, for example, the hub may transmit a connection assignment signal to the relay node. The connection assignment signal may inform the node to assign the connection with the candidate relay node and to reconfigure the active time position of the node.

In 650, the relay node transmits the connection assignment signal to the node. In this example, the connection assignment signal may be received from the hub in response to the connection request requesting the connection with the candidate relay node. The node may determine whether to change the relay node to the candidate relay node.

Figure 7:
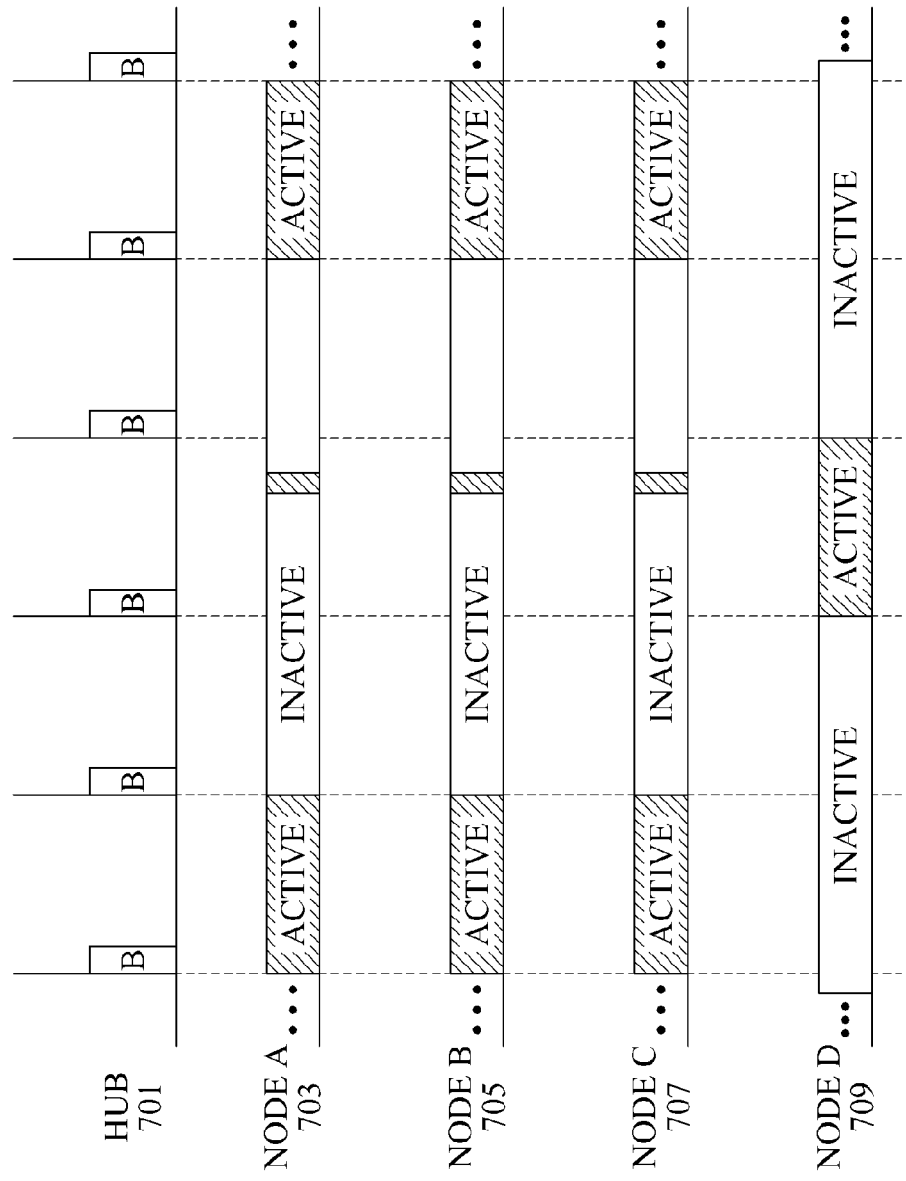
FIG. 7 is a diagram illustrating an example of operations and wake-up periods of nodes to reconfigure an active time position of a node in a WBAN.

FIG. 7 illustrates an example of operations and wake-up periods of nodes to reconfigure an active time position of a node in a WBAN.

Referring to FIG. 7, a hub 701 may be aware of wake-up periods and active time positions of all of the nodes. The hub 701 may transmit information to a node A 703 corresponding to a relay node. The information may include, for example, active time indication information that is associated with a point in time at which a node D 709 transmits an ACK signal or a T-poll signal. The node A 703 may transmit the received information to a node B 705 and a node C 707 which node A 703 currently acts as a relay for.

Based on information received from node A 703, node B 705 and/or node C 707 may be awakened from an inactive state to an active state to listen for a signal of node D 707 and then return to the inactive state. If an operational state is changed from the inactive state to the active state, node B 705 and/or node C 707 may listen for an ACK signal or a T-poll signal of node D 709 and determine whether to use node D 709 as the relay node.

In this example, node C 707 determines to use node D 709 as the relay node. In response to node C 707 selecting node D 709 as the relay node, node C 707 may transmit a connection request signal to node A 703 currently operating as the relay node, in order to request the hub 701 for change of the relay node.

Node A 703 may transmit, to the hub 701, the connection request signal received from node C 707. In response to the connection request signal of node C 707, the hub 701 may transmit a connection assignment signal to node C 707 via node A 703.

Figure 8:
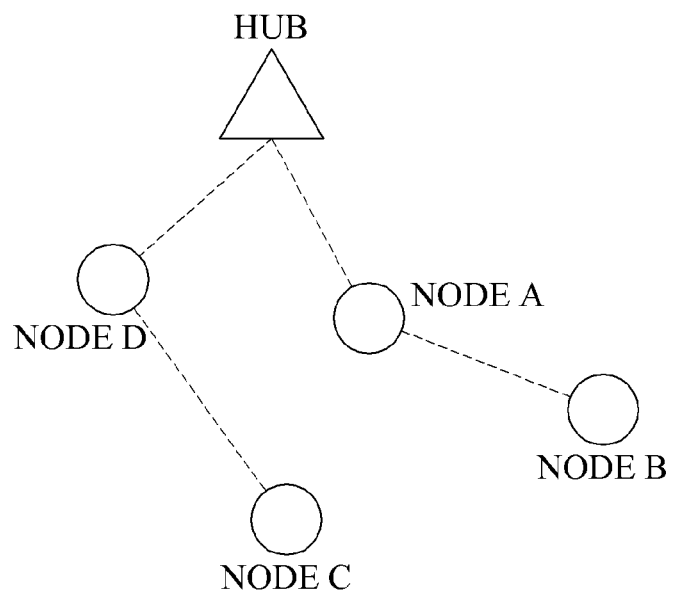
FIG. 8 is a diagram illustrating an example of a topology that is changed according to reconfiguration of an active time position in a WBAN.

FIG. 8 illustrates an example of a topology changed according to reconfiguration of an active time position of a node in a WBAN.

Referring to FIG. 1 and FIG. 8, node C determines to use a node D as a relay node. In this example, node C may change an active time position whereby node D may perform a function of relaying for node C.

For example, the active time position of node C connected to node A in FIG. 1 may be reconfigured to match an active time position of node D in FIG. 8 whereby node C may be connected to the node D.

Figure 9:
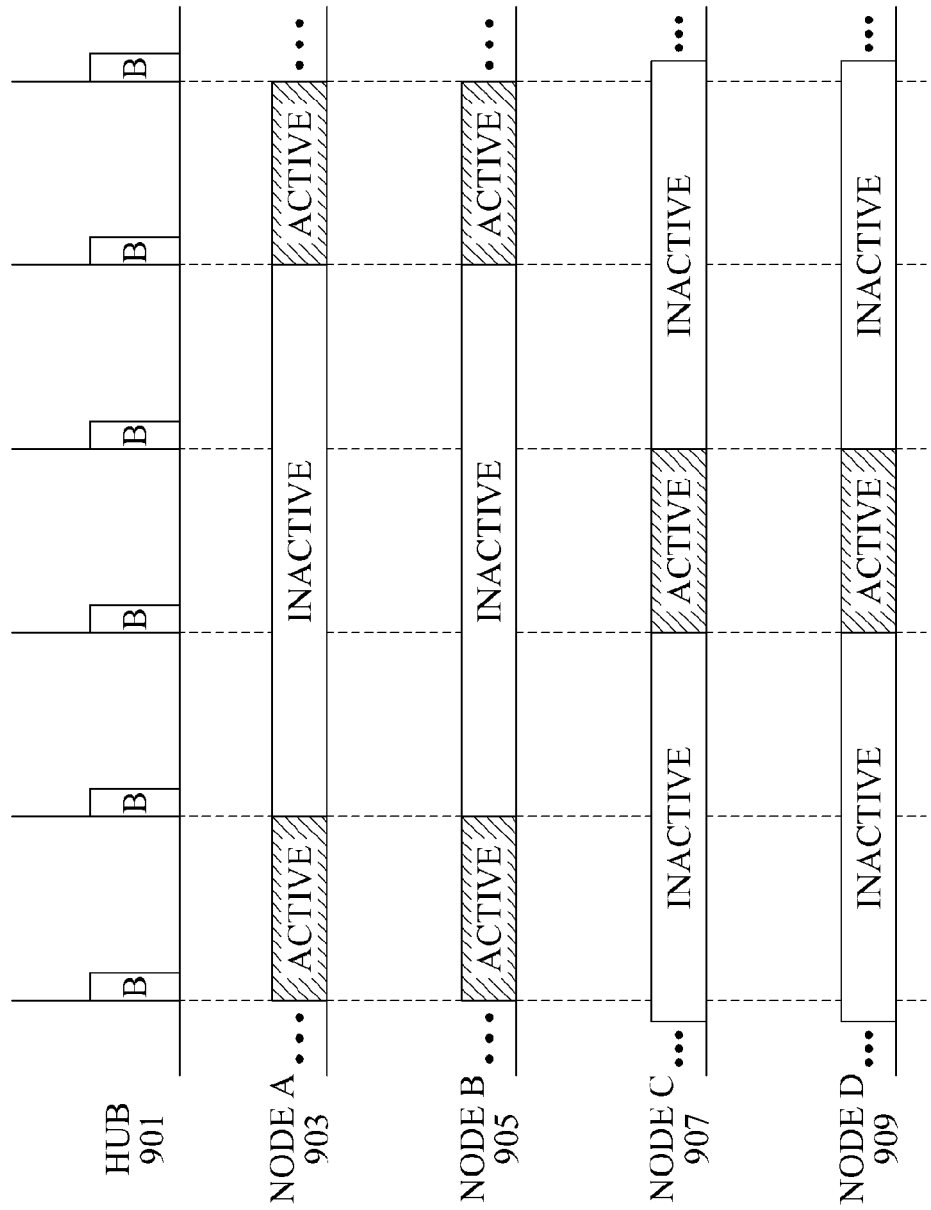
FIG. 9 is a diagram illustrating an example of wake-up periods of nodes changed after an active time position of a node is reconfigured in a WBAN.

FIG. 9 illustrates an example of wake-up periods of nodes changed after an active time position of a node is reconfigured in a WBAN.

As shown in FIG. 2, prior to changing the relay node from node A to node D, node C has an active time that matches node A. Referring to FIG. 9, after the change, node A 903 remains a relay node of node B 905, and a node D 909 becomes a relay node of a node C 907. That is, node B 905 and node C 907 communicate with a hub 901 via the respective corresponding relay nodes.

Referring to FIG. 9, because node A 903 acts as a relay for node B 905, node A 903 and node B 905 may have the same active time position. After the switch, node D 909 acts as a relay for node C 907. Accordingly, the active time for node C 907 may be reconfigured to match the active time of node D 909. Because the active time position is changed as shown in FIG. 9, node C 907 may not hear a signal of node A 903.

Figure 10:
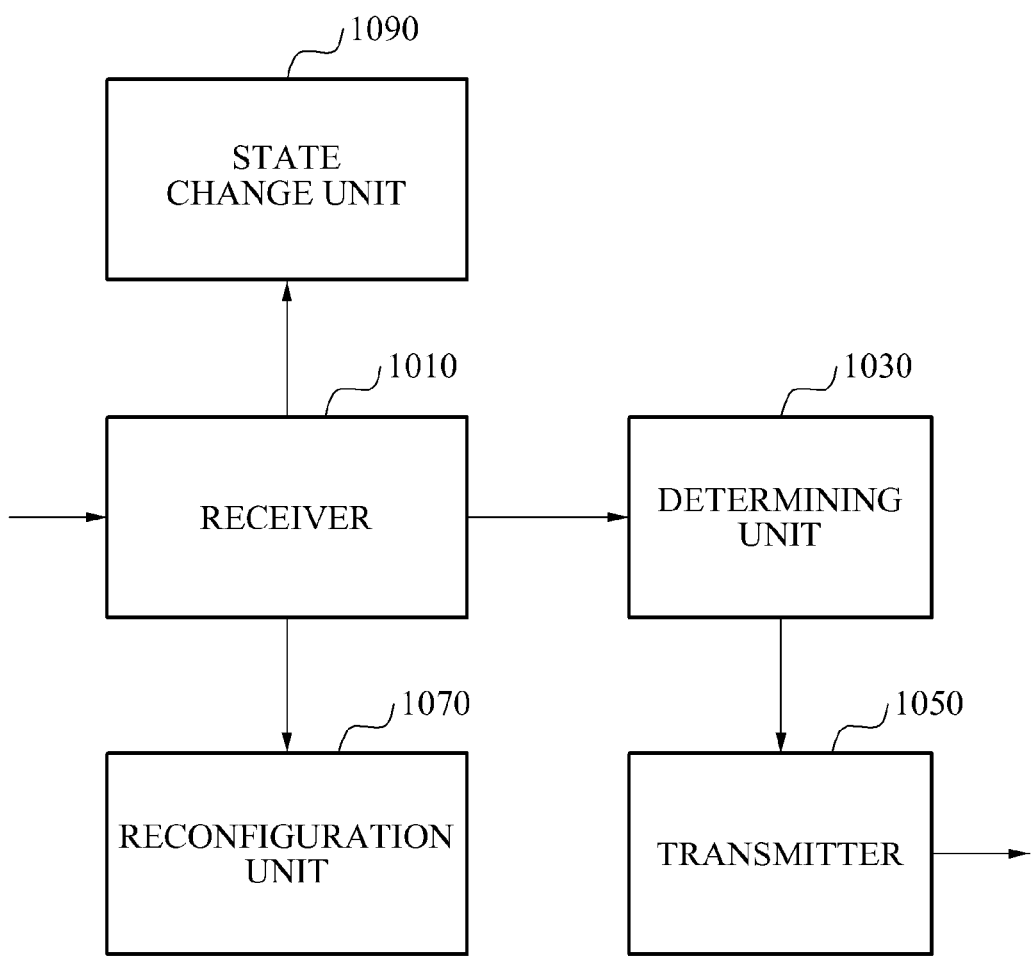
FIG. 10 is a diagram illustrating an example of a node in a WBAN.

FIG. 10 illustrates an example of a node 1000 in a WBAN.

Referring to FIG. 10, node 1000 includes a receiver 1010, a determining unit 1030, a transmitter 1050, a reconfiguration unit 1070, and a state change unit 1090.

The receiver 1010 may receive information associated with an active time position of a candidate relay node included in the WBAN from a hub via one or more relay nodes. The receiver 1010 may receive a signal transmitted from the candidate relay node using information associated with the active time position of the candidate relay node. For example, the information associated with the active time position of the candidate relay node may include information associated with a transmission point in time of each of at least one signal indicating whether an operational state of the candidate relay node is in an active state.

The determining unit 1030 may determine whether to change the current relay node to the candidate relay node, based on the signal transmitted from the candidate relay node.

The transmitter 1050 may transmit a connection request signal to the hub via the current relay node. The connection request signal may request that the candidate relay node replace the current relay node, based on the signal transmitted from the candidate relay node.

The reconfiguration unit 1070 may reconfigure an active time position of the node based on a connection assignment signal that is received in response to the connection request signal. For example, in response to the connection assignment signal, the reconfiguration unit 1070 may reconfigure the active time position of the node 1000 to match the active time position of the candidate relay node.

In response to the received information associated with the active time position of the candidate relay node, the state change unit 1090 may change an operational state of the node 1000 from an inactive state to an active state.

Figure 11:
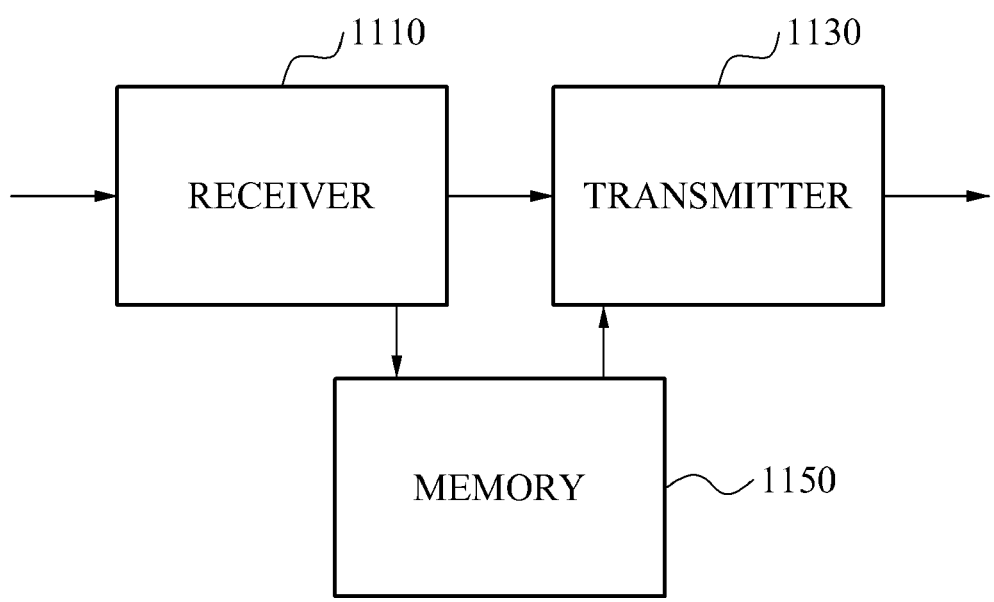
FIG. 11 is a diagram illustrating an example of a hub in a WBAN.

FIG. 11 illustrates an example of a hub 1100 in a WBAN.

Referring to FIG. 11, the hub 1100 includes a receiver 1110, a transmitter 1130, and a memory 1150.

The receiver 1110 may receive information associated with an active time position of candidate relay nodes, from the candidate relay nodes. The receiver may receive a connection request signal requesting connection with a respective candidate relay node from another node via a current relay node.

The transmitter 1130 may transmit information associated with the active time position of the candidate relay node to the other node via the current relay node, and may transmit a connection assignment signal assigning the connection with the candidate relay node, in response to the connection request signal.

The memory 1150 may store the active time information. Information associated with the active time position of the candidate relay node may include information associated with a transmission point in time of each of at least one signal indicating whether an operational state of the candidate relay node is in an active state and when the candidate relay node is in an inactive state.

In various examples, the hub may include information associated with an active time position and a wake-up period of each of the relay node, the node, and the candidate relay node.

According to various examples herein, even though a neighbor node does not have the same active time position as a node, the node may communicate with a hub by reconfiguring an active time position of the node based on information associated with the active time position of the neighbor node.

According to various examples herein, by reconfiguring an active time position of a node based on information associated with the active time position of the neighboring node, it is possible to increase energy consumption at a predetermined relay node and decrease a network lifespan.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a node in a wireless body area network (WBAN) comprising a hub, a relay node, and the node that communicates with the hub via the relay node, the method comprising:
   receiving, from the hub via the relay node, information associated with an active time position of a candidate relay node included in the WBAN;
   receiving a signal transmitted from the candidate relay node, based on the received information associated with the active time position of the candidate relay node;
   transmitting a connection request signal between the candidate relay node and the node to the hub via the relay node, based on the signal transmitted from the candidate relay node; and
   reconfiguring an active time position of the node based on a connection assignment signal that is received in response to the connection request signal.

2. The method of claim 1, wherein information associated with the active time position of the candidate relay node comprises information associated with a transmission point in time of a signal indicating whether an operational state of the candidate relay node is in an active state.

3. The method of claim 1, further comprising:
   changing an operational state of the node from an inactive state to an active state, in response to the received information associated with the active time position of the candidate relay node.

4. The method of claim 1, wherein the reconfiguring comprises reconfiguring the active time position of the node to match the active time position of the candidate relay node, in response to the connection assignment signal.

5. The method of claim 1, wherein the hub stores information associated with an active time position and a wake-up period of each of the relay node, the node, and the candidate relay node.

6. A computer-readable storage medium having stored therein program instructions to cause a processor to execute a method of a node in a wireless body area network (WBAN) comprising a hub, a relay node, and the node that communicates with the hub via the relay node, the method comprising:
   receiving, from the hub via the relay node, information associated with an active time position of a candidate relay node included in the WBAN;
   receiving a signal transmitted from the candidate relay node, based on the received information associated with the active time position of the candidate relay node;
   transmitting a connection request signal between the candidate relay node and the node to the hub via the relay node, based on the signal transmitted from the candidate relay node; and
   reconfiguring an active time position of the node based on a connection assignment signal that is received in response to the connection request signal.

7. A node in a wireless body area network (WBAN) comprising a hub, a relay node, and the node that communicates with the hub via the relay node, the node comprising:
   a receiver to receive, from the hub via the relay node, information associated with an active time position of a candidate relay node included in the WBAN, and to receive a signal transmitted from the candidate relay node using information associated with the active time position of the candidate relay node;
   a transmitter to transmit a connection request signal requesting connection with the candidate relay node, to the hub, via the relay node based on the signal transmitted from the candidate relay node; and
   a reconfiguration unit to reconfigure an active time position of the node based on a connection assignment signal that is received in response to the connection request signal.

8. The node of claim 7, wherein information associated with the active time position of the candidate relay node comprises information associated with a transmission point in time of a signal indicating whether an operational state of the candidate relay node is in an active state.

9. The node of claim 7, further comprising:
   a state change unit to change an operational state of the node from an inactive state to an active state, in response to the received information associated with the active time position of the candidate relay node.

10. The node of claim 7, wherein the reconfiguration unit reconfigures the active time position of the node to match the active time position of the candidate relay node in response to the connection assignment signal.

11. The node of claim 7, wherein the hub stores information associated with an active time position and a wake-up period of each of the relay node, the node, and the candidate relay node.

12. A node that communicates with a hub via a current relay node in a wireless body area network (WBAN), the node comprising:
   a receiver to receive a signal from a neighboring node;
   a determining unit to determine whether to change relay nodes from the current relay node to the neighboring node, based on the signal received from the neighboring node;
   a transmitter to transmit, to the hub, a request to change relay nodes; and
   a reconfiguration unit to reconfigure an active time of the node to match an active time of the neighboring node, based on a connection assignment signal received from the hub.

13. The node of claim 12, wherein the transmitter transmits the request to change relay nodes to the hub via the current relay node.

14. The node of claim 13, wherein the hub comprises one of a computer and a mobile phone, and the node comprises a sensor that performs sensing of at least one of medical applications, mobile healthcare, and chemical/biological features of a patient.

* * * * *